United States Patent [19]

Reeder

[11] Patent Number: 5,852,812
[45] Date of Patent: Dec. 22, 1998

[54] BILLING SYSTEM FOR A NETWORK

[75] Inventor: Mary Reeder, Seattle, Wash.

[73] Assignee: Microsoft Corporation, Redmond, Wash.

[21] Appl. No.: 518,253

[22] Filed: Aug. 23, 1995

[51] Int. Cl.$^6$ .................................................... G06F 17/60
[52] U.S. Cl. ................................ 705/39; 705/26; 705/34; 705/40
[58] Field of Search .................................. 395/201, 216, 395/217, 220, 221, 226, 227, 230, 234, 235, 238, 239, 240, 241, 242, 601, 610, 200.01, 200.02, 200.03, 200.09; 340/825.3, 825.33; 235/375, 377, 378, 379, 380, 382

[56] References Cited

U.S. PATENT DOCUMENTS

| | | | |
|---|---|---|---|
| 4,766,293 | 8/1988 | Boston | 395/241 |
| 4,799,156 | 1/1989 | Shavit et al. | 395/226 |
| 4,926,368 | 5/1990 | Morita et al. | 364/715.05 |
| 5,311,302 | 5/1994 | Berry et al. | 348/14 |
| 5,347,632 | 9/1994 | Filepp et al. | 395/200.09 |
| 5,420,405 | 5/1995 | Chasek | 235/379 |
| 5,442,771 | 8/1995 | Filepp et al. | 395/200.09 |
| 5,526,035 | 6/1996 | Lappington et al. | 348/13 |
| 5,561,708 | 10/1996 | Remillard | 379/96 |
| 5,570,126 | 10/1996 | Blahut et al. | 348/7 |
| 5,583,563 | 12/1996 | Wanderscheid et al. | 348/13 |

OTHER PUBLICATIONS

"AT&T, British Telecom and KDD Announce Expanded International Calling Capabilities"; *PR Newswire*; Jan. 18, 1989; Dialog: File 148, Acc# 03836564.

"Minitel Services Company Announces PC Connect (TM)"; *News Release*; Aug. 2, 1991; p. 1; Dialog: File 16, Acc#03437663.

*PC Magazine*; v13 n13; Jul. 1994; cover only.

"New on the Net"; *Internet Business News*; Dec. 8, 1994; Dialog: File 16, Acc# 05409204.

Lang; "Cashing in: The Rush is on to Buy and Sell on the Internet"; *Advertising Age*; Dec. 19, 1994; p. 11; Dialog: File 16, Acc# 05419137.

*Primary Examiner*—Stephen R. Tracs
*Attorney, Agent, or Firm*—Leydig, Voit & Mayer, Ltd.

[57] ABSTRACT

A billing system for on-line computer networks is disclosed. Customers of the on-line system are billed in their own currency for billable events which are generated. Billable events can include access to premium services, file downloads or gateway connections to other systems. Real-time processing of billable events allows the system to post charges to a customer's on-line charge statement quickly following generation of the billable event.

31 Claims, 12 Drawing Sheets

BILLING SYSTEM OVERVIEW

FIG. 8 PROCESSING EVENT DATA

RETRIEVE CHARGE FROM RECORD

BILLING SYSTEM FOR A NETWORK

BACKGROUND OF THE INVENTION

1. Field of the Invention

This invention relates to billing systems and, more specifically, to a billing system for an on-line computer network.

2. Description of the Related Technology

On-line computer systems are becoming an integral part of many corporations' standard business practices. For example, a number of companies provide on-line technical support and information on their products and services. In addition, some companies now offer products and services which can be purchased electronically through computer networks such as the Internet. Payment for these products and services is normally either charged to the customer's credit card, debited from the customer's bank account or billed to the customer. One of the challenges that has arisen from on-line purchasing is an accurate method of billing customers for their products and services.

Customers can be billed for on-line charges that accrue while the customer accesses the system. These charges accrue, for example, for every hour that the customer maintains a connection to an on-line network. A number of on-line systems such as Compuserve, America Online and Prodigy can charge customers for every hour that they are connected to the network. In addition, these networks can charge "premium surcharges" which begin accruing when a customer accesses a specific area of the on-line network. For example, there may be an additional surcharge for accessing stock quotes or business news sections of the on-line network which is over and above the base subscription price the customer pays per hour to access the network. A formidable challenge in these on-line networks is pricing in a timely manner so that accurate charges can be reviewed by the customer in real-time.

With potentially millions of users accessing an on-line network, a billing system must be very efficient to properly charge the customer base while maintaining an up-to-date on-line statement of current charges. Some currently available on-line systems only update customer statements every twenty-four hours.

In addition, on-line computer systems need to address the currency-conversion problems associated with billing customers throughout the world. In most instances, customers are charged a fluctuating price for their on-line time that depends on daily currency prices. For example, some U.S. based on-line systems charge their foreign customers different prices every month depending on the current price of the U.S. dollar. In these systems, the customer chooses a particular currency to be charged in, known as the base currency. There is also a local currency that is unique to their home country. This method of doing business is very advantageous for the on-line company because they do not bear the risk of currency price changes.

However, customers in these on-line systems are charged different prices for the same services due to changing valuations of the U.S. dollar. This is not advantageous for the customer because they are never sure what a particular service will actually cost until getting a bill from their on-line or credit card company.

While complex billing systems for the UNIX operating system such as the Arbor Front-BP system from Kenan Technologies (Cambridge, Mass.) are available, they do not appear to provide the sophistication necessary for pricing and billing millions of simultaneous on-line users in real-time on a large network.

A system for interactive on-line electronic communications and processing of business transactions has been described in U.S. Pat. No. 4,799,156 to Shavit et al. Although a billing system for an on-line network is described in U.S. Pat. No. 4,799,156, it does not describe methods of tracking the progress of millions of simultaneous users and providing a real-time, on-line statement of each customer's account. Thus, a need exists for a sophisticated billing system in an on-line network that can track the progress of a customer during an interactive session and provide real-time statements.

SUMMARY OF THE INVENTION

The on-line network of the present invention has the capability to price and bill international customers in their local currency from a single credit card processor. Other known on-line companies with international customers handle international billing by pricing their services in U.S. dollars and then having associated banking service companies in the customer's home region convert the U.S. Dollar charges to the local currency. The problem with conversion is that the customer bears the risk of currency fluctuations. For instance, the monthly charge for subscription service would vary under this scenario.

In other on-line billing systems, a local presence is required and there is more room for inefficiency and error caused by the lack of centralization. The billing system of the present invention passes authorization requests in local currency to the credit card processor in the merchant's home country. All billable transactions which are not priced in a subscriber's base currency, or the system defined currency which may or may not differ from the local currency, are converted to a base currency prior to billing.

The present invention includes a high volume, scalable, real-time billing system, which is designed to run on a personal computer. Although a number of prior billing systems run on mini or mainframe computer systems, the billing system of the present invention handles issues of high-volume scalability and response time by using a number of techniques. First, billable events that occur within the system are handled in data sets, rather than individually. This increases the system's overall throughput.

In addition, in one preferred embodiment the system runs as multithreaded services within the Microsoft Windows NT operating system. The ability to run many tasks simultaneously within the Windows NT operating system helps alleviate many of the performance problems found in prior mainframe systems. Further, the system parses its datasets prior to acting on them so that events with similar characteristics are processed simultaneously. This also leads to a more streamlined system for processing billable events.

Due to the system's high throughput, customer's can be notified of charges to their accounts via on-line statements. The system of the present invention can be configured to update on-line statements at configurable intervals, such as every fifteen minutes. The data-driven architecture is easy to enhance/customize. Additionally, the presently preferred billing system incorporates a "plug & play" approach that allows new billable events, custom promotions, and other billing features to be easily integrated with the existing system.

One embodiment of the present invention is a method for billing in a computer network, including the steps of providing a plurality of prices for a transaction, each price specific to a local currency; selecting one of the local currency prices for a transaction; and transmitting the selected local currency price to a credit company.

Another embodiment of the present invention is a billing system. The system includes a plurality of uniquely identifiable computing devices. In addition, the system has a data center connected to the computing devices and a credit system, wherein the data center stores a plurality of data items of commercial value, wherein the data center records data representative of the computing devices and transmissions of data items from the data center to the computing devices, wherein the data items have associated price information in a plurality of currencies, and wherein the data center provides price information indicative of data item transmissions to the credit system.

An additional aspect of the present invention is a billing system for an on-line network, including a billing database receiving charge data in a plurality of currencies; an event generator providing events indicative of network access to the billing database; a currency converter receiving currency exchange rates for the currencies and charge data from the billing database; and a credit company computer receiving charge data from the billing database and the currency converter so as to charge network customers in a local currency.

DETAILED DESCRIPTION OF THE PREFERRED EMBODIMENTS

Figure 1:
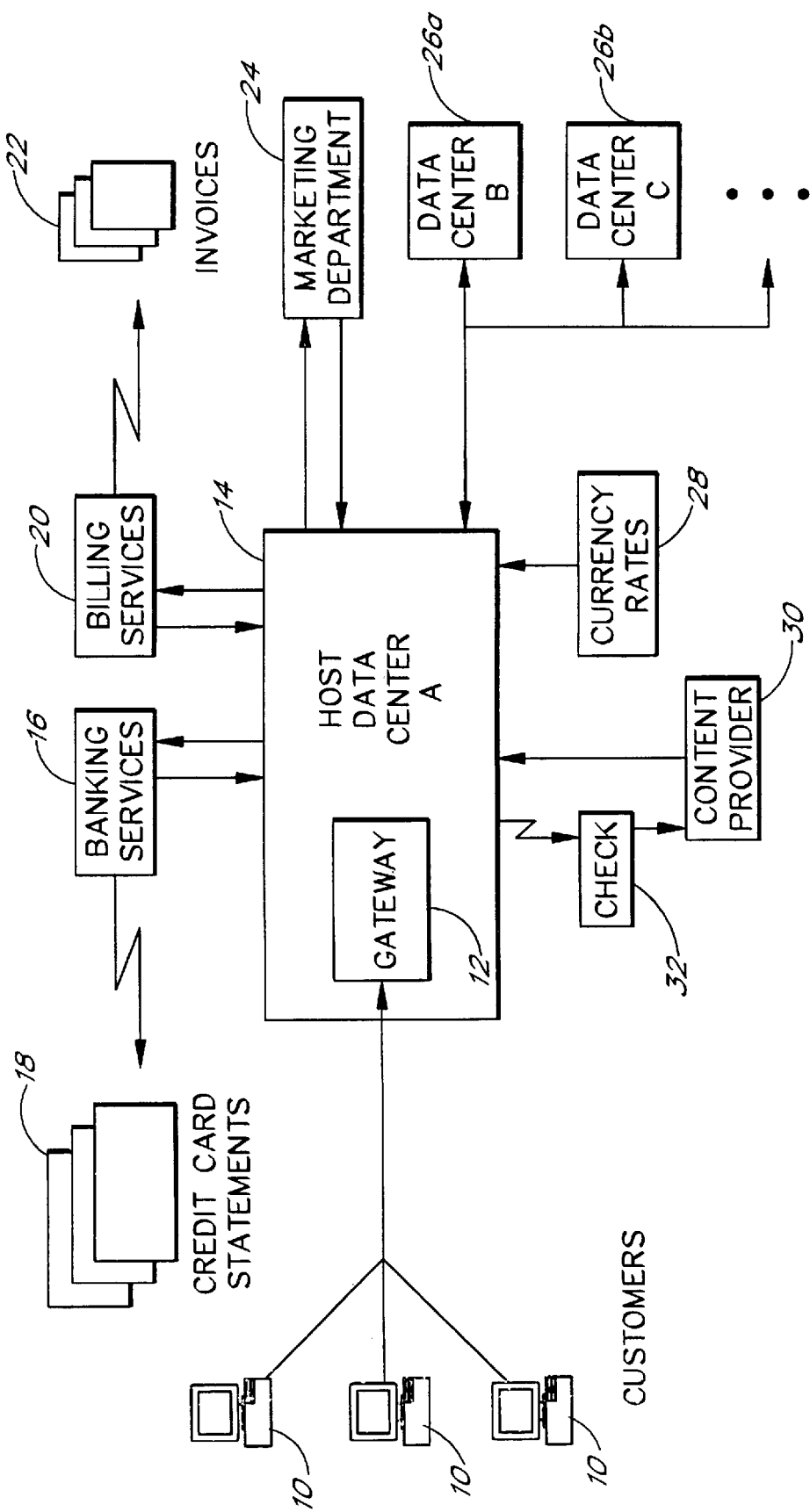
FIG. 1 is a block diagram showing an overview of the billing system of the present invention.

Reference is now made to the drawings wherein like numerals refer to like parts throughout. For convenience, the following description will be organized into the following five principle sections: ADVANTAGES OF THE BILLING SYSTEM; BILLING SYSTEM OVERVIEW; EVENT OBJECT STRUCTURE; BILLING PROCESS; and CONCLUSION.

I. ADVANTAGES OF THE BILLING SYSTEM

The present invention is a billing system that can be used to bill customers in various regions of the world in their own base currency. The billing system event generation and collection system that can collect billable event data in a network. In the presently preferred embodiment, billable application events are generated by application programs running on the network. An application event is an object that is created in the network to hold data relating to the event. For example, the date, time and event identification may be held as data within an event object. One part of the network can therefore create an event object that records a billable event in the system, and transport that data to another part of the network for processing.

Event objects can also be created and then advantageously copied to many different sites on the network. For example, an event object that is created when a customer closes a connection to the distributed network (i.e., signs off) can be generated at a gateway computer and then copied to a billing computer for tracking the customer's on-line usage. Because the event generation system is designed to preferably run under the Microsoft Windows NT® operating system, error trapping can alert a system operator when any process does not complete accurately. As is known, the Windows NT operating system will generate Alert objects that will notify a system operator of any errors that have occurred within the system.

In the presently preferred embodiment of the invention, a billable application event is a C++ object derived from a class called CApplicationEvent. The CApplicationEvent class encapsulates the basic information that is common to all application events and is discussed in more detail below in reference to FIG. 4.

A "class" as discussed herein is a definition of a data type that specifies the representation of objects of the class and the set of operations that can be applied to the objects. An object of a class is a region of storage or memory. The notion of a "class" will be understood by those skilled in the object-oriented programming technology and, in particular, by those familiar with the "C++" programming language. Classes may be more fully comprehended by reference to *The Annotated C++ Reference Manual,* Ellis, Margaret and Stroustrup, Ejarne, Addison-Wesley Publishing Co., 1990.

The rationale for programmer-defined classes is that it provides data abstraction by allowing the representation details of objects to be hidden and accessed exclusively through a set of operations defined by the class. For example, putting a class in human terms, a "bakery class" would provide a mulberry pie sale operation to allow a customer to purchase a mulberry pie without any knowledge on the part of the customer as to how pies were stored at the bakery, or how the customer's pie was selected from a number of different pies.

The system of the present invention provides advantages over prior systems due to the efficiency of handling sets of event objects and sets of customer billing records. The system also provides advantages relating to its ability to bill customers in their own base currency. These and other advantages of this system will be more apparent from the following discussion.

II. BILLING SYSTEM OVERVIEW

This section provides an overview of the billing system of the present invention. Referring now to FIG. 1, an overview of a distributed networking system which utilizes the billing system of the present invention is described. It will be understood that the present invention can be applied to other networks such as interactive television, ISDN, wireless telephone networks and so forth, and it shall not be restricted to on-line networks.

A series of customers 10 are linked through a gateway 12a, 12b and 12c (shown in FIG. 2) to a host data center 14. In one embodiment, the host data center 14 is preferably a part of the Microsoft Network (MSN), however, other on-line distributed systems may be similarly configured.

The host data center 14 also communicates with several outside services. For example, the host data center 14 communicates with a banking services center 16 which produce credit card statements 18 to bill customers 10 for their services on-line. Several banking transaction companies provide services for charging customers for on-line usage including NaBANCO and Checkfree. Both of these companies work with issuers of credit cards to provide direct billing of customers for their on-line data services. The banking transaction companies act as clearing houses to process transactions for a number of credit card issuers. The banking transaction companies submit transactions (e.g. customer charges) to credit card issuers for authorization and account settlement. The credit card issuers then produce bills which are sent to the customers.

The host data center 14 also communicates with a billing services center 20 which can produce invoices 22. Billing service providers 20 can provide invoices 22 to customers who choose not to have their accounts linked to a credit card account. A corporation that sponsors its employees on the network system may request to be invoiced for all charges incurred by the employees, for example.

The host data center 14 can interface with a marketing department computer 24 so that events that are generated at the host data center 14 can be used by the marketing department for gauging customers' interest in a particular area of the distributed network. For example, the marketing department may be interested in knowing how often customers access a particular area of the network and what is their purchasing profile (e.g., do they live in an upper income neighborhood as expressed by their zip codes). By communicating with the host data center 14, the marketing department can be provided with this type of information.

The host data center 14 can also communicate with remote data centers 26a,b so that events which occur on the remote data centers 26a,b can be communicated to the host data center for processing. Events that occur on the remote data centers 26a,b are saved to event object files. These files are then retrieved by the event collector within the host data center 14. Thus, the host data center 14 can track events which occur on remote data centers 26a,b throughout the distributed networking system. The remote data centers 26a,b may be located in the same country as the host data center 14 or different countries.

Since the customer 10 may be located in any country of the world, currency rates 28 are regularly stored in a database at the host data center 14 so that currency conversion can take place. For example, a customer 10 located in France might download a file from England that is priced in English pounds. To properly charge the French customer 10, the price for the downloaded file would need to be converted to French francs on the day of the file download. For this purpose, a currency conversion table is therefore regularly uploaded to the host data center 14 from any one of a number of known exchange rate providers.

Figure 2:
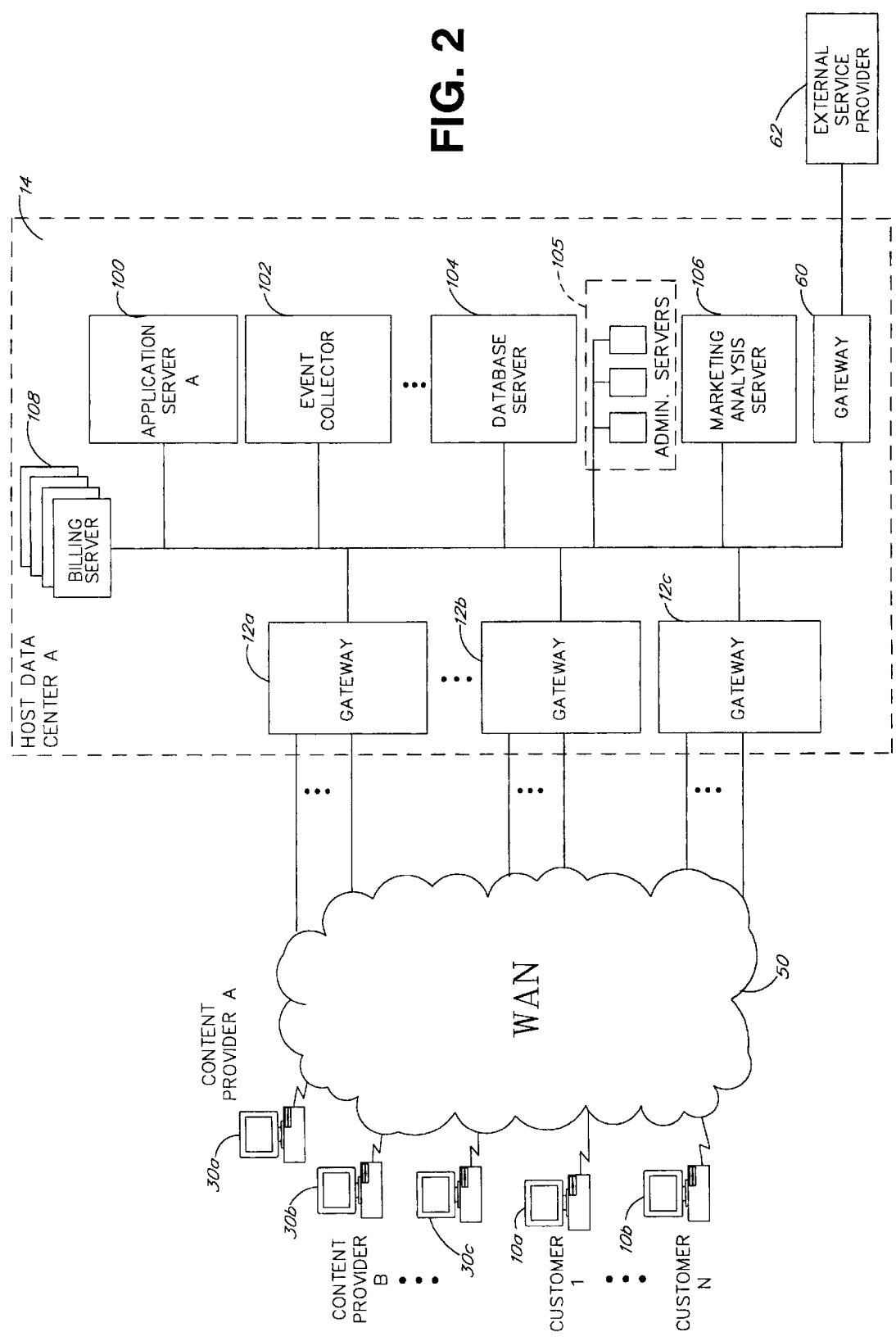
FIG. 2 is a block diagram of the host data center shown in FIG. 1.

A significant feature of the host data center is its interface with content 30a, 30b and 30 c (FIG. 2). These content providers produce and distribute information to the host data center 14. One type of content provider might, for example, provide news clippings to the host data center. Another type of content provider 30 might provide real-time stock quotes to the host data center 14. In addition, content providers can provide services to customers attached to the host data center. One type of service, for example, could be a gateway to the Internet or other computer network.

In a number of cases, content providers charge an additional fee for access to their services. The additional fee is normally billed by the owner of the host data center 14 through either the banking services 16 or billing services 20 interfaces. Thus, the owner of the host data center 14 collects money from the customers 10 for the services provided by the content provider 30. The owner of the host data center 14 then pays royalties to the content provider 30 through a check 32 or electronic payment means to pay the content provider 30.

FIG. 2 provides a block diagram overview of the host data center and its associated connections. As shown, the customers 10a, 10b access gateways 12 through a Wide Area Network 50 (WAN) as is well known in the technology. In addition, content providers 30 also can access the host data center 14 through the same wide area network 50 and gateways 12a,b,c.

The gateway 12 is designed to handle communication protocols between numerous customers and the host data center 14. Customers can be connected to the gateway 12 through standard telephone lines using a modem, or directly linked through, for example, a TCP/IP connection as is well known in the technology.

The main function of the gateway 12 is to allow a computer, such as one of the customer computers 10 to communicate with one network protocol with another computer located in the host data center 14 which has its own network protocol. The gateway 12 also manages traffic from the host data center 14 to the customer 10. The gateways 12 provide ready access to other networks such as the Internet. For example, a Gateway 60 might provide the customer 10a with access to an external service provider 62. It should be understood that the present system is extensible so that multiple gateways can service the host data center 14 and the customers without departing from the spirit of the invention.

The host data center 14 includes multiple server computers, each one running an application specific task. An application server 100 is designed to run many of the programs requested through the gateway 12 by the customer 10. The application server 100 may run programs such as bulletin board services, file download systems, chat rooms, video on demand, and many other services.

Whenever an event, such as a file download or logoff, occurs in this system, an event object is created. Once an event object is created, it is stored locally in an event object file and then retrieved by an event collector 102. The event collector 102 can also gather event objects from application servers on remote data centers 26 (FIG. 1).

Once the event collector 102 has gathered event object files, they are typically communicated to another server, e.g., administration servers 105, marketing analysis server 106, or a billing server. The administration servers 105 are used to manage computer traffic within the host data center 14. The marketing analysis server 106 is used by the marketing department 24 to analyze data stored within the event objects that were gathered by the event collector 102.

In addition, the database server 104 can collect and analyze data stored within event objects. That data can then be transmitted to the billing server 108 to provide real-time, on-line billing statements to the customer 10. The process of collecting event objects and transmitting the data within them to other servers is described below in more detail. The structure of an event object is described in reference to FIG. 4.

Figure 3:
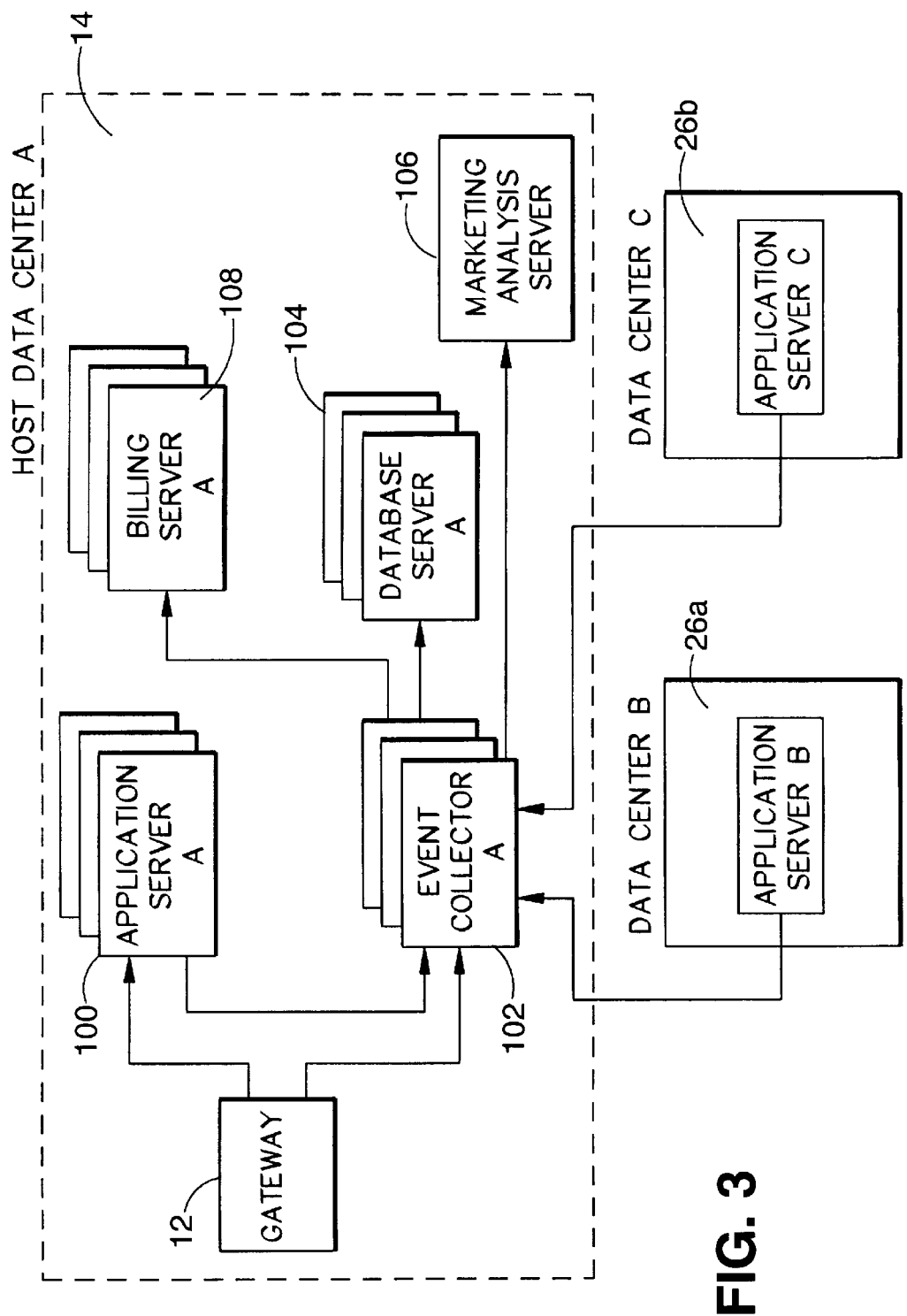
FIG. 3 is a block diagram showing the data flow within the host data center shown in FIG. 1 and from additional data centers.

FIG. 3 shows a detailed view of the flow of data between the gateway 12, application server 100, event collector 102, database server 104, billing server 108 and marketing analysis server 106. As is shown, data flows from the gateway 12 to the application server 100 as an interprocess communication pipe between these systems is opened.

Moreover, data flows from the gateway 12 to the event collector when event object files are copied from the gateway to the event collector. The events that are generated on the gateway 12 are usually related to a customer's interaction with the host data center 14. For example, a closed connection event or closed pipe event is usually generated by the gateway computer 12. These event objects are then transferred to the event collector 102.

Data can also flow from application servers located at remote data centers 26 to the event collector as shown in FIG. 3. As explained above, event objects are not usually moved from application servers to event collectors unless they are serialized into an event object file.

Figure 7:
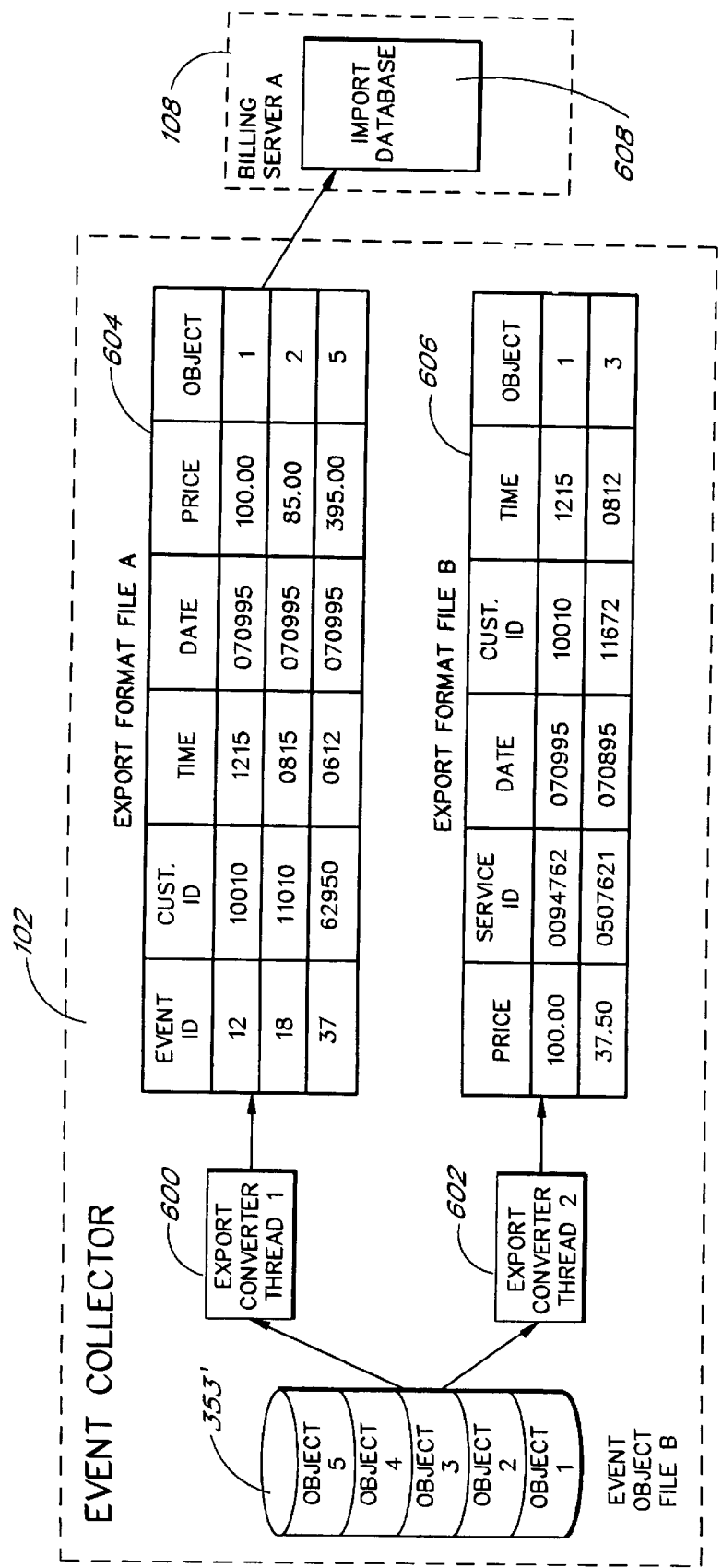
FIG. 7 is a block diagram the process of exporting and converting event object files into export format files which are thereafter inserted into an import database.

Once event object files have been copied to the event collector 102, they are converted to many different export format files (see, e.g., 604, 606 at FIG. 7). An export format file is a file that contains the data within the object that is to be sent to other systems and services within the host data center 14. An example of an export format file is a tab-delimited text file. This type of text file can be easily imported into most databases and spreadsheet programs.

After the export format file has been created on the event collector, it is imported by either the marketing analysis server 106 or billing server 108. These servers use data from the event objects, such as Customer ID number and Event ID number, to produce bills or usage statements. The following section discusses the structure of the event objects and their class hierarchy.

III. EVENT OBJECT STRUCTURE

Figure 4:
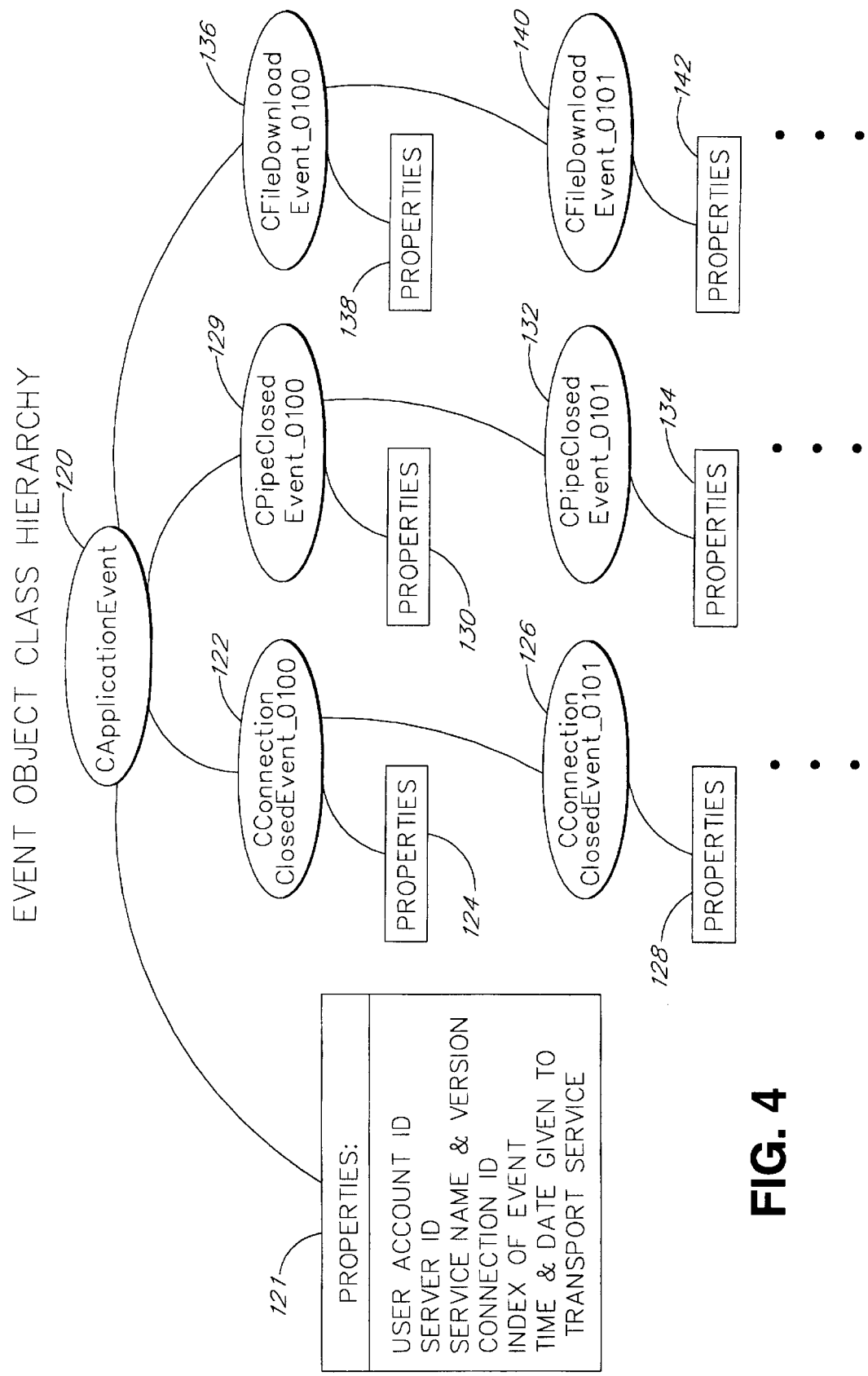
FIG. 4 is a diagram illustrating the C++ class hierarchy of event objects in the present invention.

Referring now to FIG. 4, the event object class hierarchy is shown. The parent class in this hierarchy is the CApplicationEvent 120. All other event object classes derive from the CApplicationEvent object. The associated properties 121 of the CApplicationEvent class 120 are shown below in Table 1.

TABLE 1

| Properties of CApplicationEvent | | |
|---|---|---|
| PROPERTY | VARIABLE | DESCRIPTION |
| HACCT | m_haUserId | Unique Id of the User that was connected. |
| MOS_SERVER_ID | m_msidServerId | Unique Id of the Server that the Service was running on. |
| DynamicString | m_strServiceName | The name of the Service that generated the event. |
| SERVICE_VERSION | m_sv | The version of the Service that generated the event. |
| DynamicBuffer | m_bufConnectionId | The first byte of the data is the size of the Connection Id. |

TABLE 1-continued

| Properties of CApplicationEvent | | |
|---|---|---|
| PROPERTY | VARIABLE | DESCRIPTION |
| DWORD | m_iEventLogged | Index of this event in this Server's event stream |
| FILETIME | m_ftLogged | Date/time that this event was logged. |

The properties illustrated in Table 1 are shared within all members of the class hierarchy shown in FIG. 4. Examples of application event classes as shown in FIG. 4 are: CConnectionClosedEvent, CPipeClosedEvent, and CFileDownloadEvent. Each class of application events is unique and describes completely different events that occur in the system.

For instance, the CConnectionClosedEvent class describes events that occur when a connection between the customer and the distributed networking system is broken. The CPipeClosedEvent class describes events that occur when an intercommunication process pipe between the customer and an application server is broken. This particular event may be generated a large number of times in a single on-line session.

Although these events describe different situations on the network, they need to be treated generically by the operating system for functions like: storage, transmission, collection and export. The class CApplicationEvent was designed to accommodate generic handling of the various event classes. As discussed above, all application events derive from the CApplicationEvent parent class and each preferably exports a series of virtual functions that can perform the following operations:

1) Export all member variables into a multi-line, commented, human readable string.

2) Produce comma-separated output of member fields for export to Spreadsheets, Databases and Wordprocessors.

3) Produce tab-delimited output of member fields of export to the Billing Database or other SQL database.

4) Serialize/Deserialize the object for transmission to another machine or for storage to some persistent medium.

By building the export format file definition (e.g. comma-separated, tab-delimited, fixed width) code into virtual functions of the objects, the code for serialization/deserialization is kept with the object structure itself. This allows a single thread in the operating system to act on any object by issuing a generic command to the object to serialize/deserialize. The object knows how to act upon itself, thereby reducing the system's housekeeping overhead. Any utilities that need to work with application events become easier to write and maintain because they can treat all events as a CApplicationEvent and use the virtual functions of the object to perform event-specific functions. Modifications can be made to the event objects without changing any code in the operating system and utilities that manipulate the objects.

Once an event occurs in the network that runs the billing system of the present invention, an event object is created which holds data relating to the event. The event object is normally produced on the same system where the event has occurred and thereafter stored to an event object file as described below.

Events occur whenever a preselected action occurs on the system. Normally, events are triggered by some action taken by the customer. For example, an event that tracks the amount of time a customer is on-line can occur when a customer first logs into a computer system. Additionally, events can occur when the customer logs out, downloads a file, accesses specific areas of the computer network or performs any other function that generates events as programmed.

As shown, there are presently three subclasses of the CApplicationEvent class 120. However, it can be recognized that many other objects can be added to this hierarchy as the event generation system is designed to be extensible. Each of these three classes, as described below, can have many different versions. As illustrated in FIG. 4, the CConnectionClosedEvent_0100 122 has associated properties 124. CConnectionClosedEvent_0101 126, another version of the event, with associated properties 128 is also illustrated in FIG. 4. As is known in the standard C++ class hierarchy scheme, the CConnectionClosedEvent_0101 objects will not only contain properties 128, but will also inherit all of the properties 124 of its parent. The CConnection Closed Event object is created when a user logs off the system, therefore terminating the connection from the customer 10 to the gateway 12 (FIG. 1).

The second subclass of CApplicationEvent 120 is the CPipeClosedEvent_0100 class 129 with associated properties 130. The CPipeClosedEvent object is produced when the connection between the server 12 and application server 100 is disrupted. It should be noted that during a normal on-line session, multiple pipes from the gateway 12 to the application server 100 may be in simultaneous use by the customer at any time. Thus, generating a CPipeClosedEvent 128 does not indicate that the customer 10 has logged off the system. Rather, it simply indicates that the customer has closed an interprocess communication pipe to a particular application on the application server. As is shown in FIG. 4, the CPipeClosedEvent class 128 has a subclass 132 which has its own associated properties 134.

The third class of objects within the CApplicationEvent class 120 is the CFileDownloadEvent_0100 class 136 which has associated properties 138. A CFileDownloadEvent object 136 is created when a customer downloads a file from the application server 100. An additional version of the CFileDownloadEvent 140 is also shown with its associated properties 142.

Although only three subclasses of the CApplicationEvent class 120 are illustrated in FIG. 4, it should be recognized that many subclasses of CApplicationEvent can be added to the system so that desired events can be generated by modifying the header file of the main CApplicationEvent class.

Now that the structure of the event objects and their virtual functions have been discussed, the following section provides an overview of an exemplary on-line billing system of the present invention.

IV. BILLING PROCESS

Figure 5:
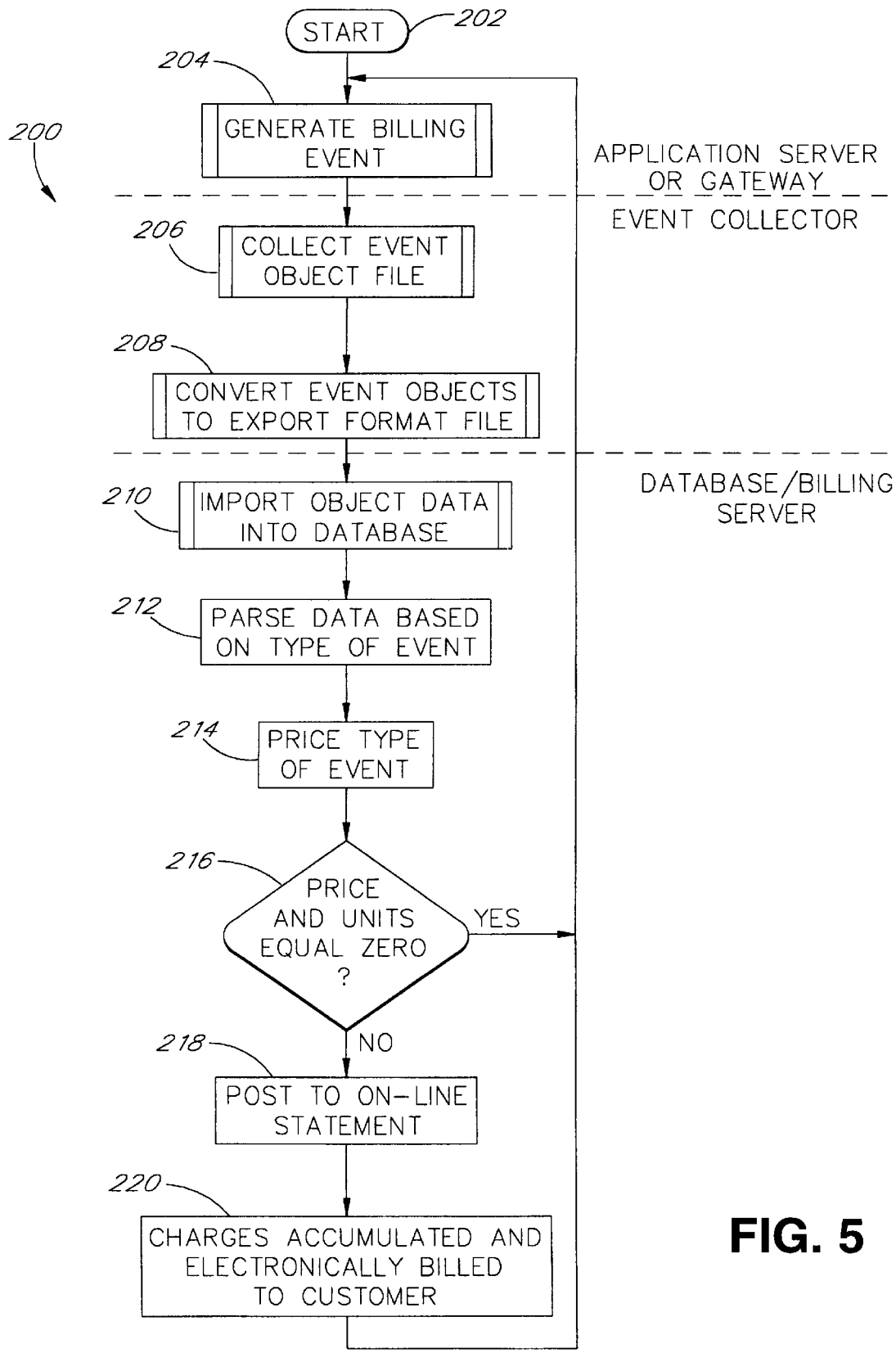
FIG. 5 is a flow diagram showing an overview of the billing system of the present invention.

An overview of the billing process of the present invention is illustrated in the flow diagram of FIG. 5. The billing process 200 begins at a start state 202. After the process 200 has begun, a billing event is generated at process 204. As described above, a billing event can be generated whenever the customer performs a billable action. For example, when a customer downloads a file, an event object is created that can then be used in the billing system to charge the customer for the file.

Figure 6:
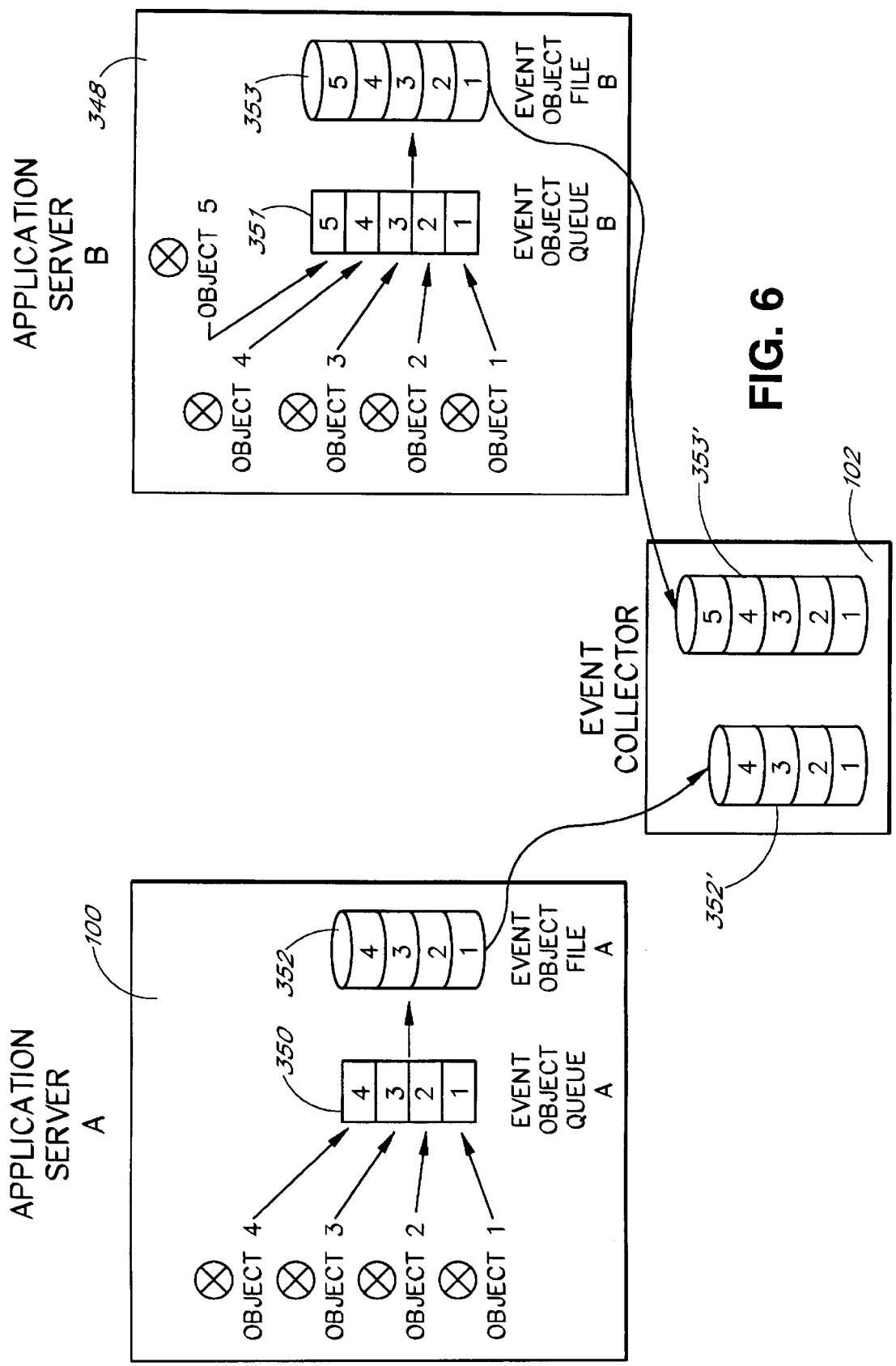
FIG. 6 is a block diagram illustrating the movement of objects from application servers to an event collector.

Billing events typically occur on either the application server 100 or gateway 12 (FIG. 2). Once a billing event has been generated at process 204 the event objects generated by the billing event are gathered by the event collector 102 at a process 206. Although the billing events generated at process 204 are produced individually, they are first saved to an event object file within either the application server or gateway (FIG. 6). Thus, the event object file is a binary compilation of a number of individual events that have been produced on the application server or gateway.

The system of the present invention has a very high throughput because objects are transferred from the source of the event to the event collector as binary compilations called event object files. Because the data stored within the objects of the event object file that is collected at process 206 cannot be exported easily to other systems, the file is converted to an export format file at process 208. The export format file contains data that is stored within the event objects, but is in a format which is easily read by other programs. For example, one type of export format file would be a tab-delimited text file. In this type of file, all of the data that resided within the object is read and placed in a tab-delimited text format. This type of file can then be easily imported into a billing or database server.

Once the process 200 has converted the event object file to an export format file at process 208, the billing server 108 imports the object data stored in the export format file into its database at process 210. The billing database can be part of a SQL server running within the host data center 14 or can be located at a remote site. Other database servers would function in a similar manner.

After the process 210 has imported data from the objects into a billing database, the data is parsed based on the type of event at a state 212. Currently, there are two major categories of event types which are parsed at state 212. These event types are transaction events and time-based events. Other event types are conceivable.

One example of a transaction event is a file download by the customer 10 from an application server. By downloading a file the customer is charged a set fee per download. A time-based event is one wherein charges accumulate over a period of time. For example, accessing stock quotes on a distributed network may incur charges for every minute that the customer remains on-line. The customer is then billed a set fee for every minute of on-line time in the stock quotes area.

Once the object data has been parsed at state 212 it is priced at a state 214. To determine the appropriate price for either a transaction based event or time based event, the system 200 refers to pricing rules that have been defined into the system. The pricing rules give the system flexibility for charging different customers varying prices based on many different parameters. For example, a 10% discount from the normal price can be given on Tuesdays and Thursdays. This would be one type of a pricing rule. Other pricing rules might give discounts to certain groups of individuals having specific customer ID numbers. As an example, a discount may be given to customers who work for a particular corporation.

Similarly, pricing rules can affect time-based event charges. For example, usage fees for accessing the distributed network can be lowered or removed for certain groups of individuals. After a particular price has been associated with an event using the pricing rules, the system 200 makes a decision whether the price and number of units equals zero a decision state 216.

If either the price or number of units does not equal zero at decision state 216 then it is posted to the customer's on-line statement at state 218. However, if both the price and number of units are equal to zero at decision state 216, the process 200 continues to wait for billing events to be generated by looping back to process 204. However, if either the price or units are greater than zero at decision state 216 and is thereafter posted to the on-line statement at state 218, charges are accumulated and electronically billed to the customer at state 220.

To more specifically describe the billing process, FIG. 6 shows a block diagram of the process used to collect event objects.

A. Storing Objects to Event Object Files

FIG. 6 illustrates a block diagram of the process the system of the present invention undertakes to create and collect event objects. As shown, the application servers 100 and 348, located respectively at the host data center 14 and the remote data center 26, create objects which are stored into, respectively, event object queues 350 and 351.

The event object queues 350, 351 are normally stored in memory within the application server or gateway so that the objects can be rapidly saved to a single file. The event object queues 350, 351 hold instantiated objects whose property values have already been set.

The process of adding objects into the event object queues is ongoing while the application servers 100, 348 are being accessed by customers. A separate background thread running on the application server removes the events from the event object queues 350, 351 and serializes and stores the event objects to the event object files 352 and 353, respectively. This background storage thread, part of SRV.DLL, is preferably a Microsoft Windows NT thread running within the Microsoft Network transport service software. The background storage thread functions by searching the event object queue for an event object and then serializing and storing the objects from that queue.

This storage thread momentarily gains control of the queue, removes the object at the head of the queue, and claims ownership of it. The storage thread then relinquishes control of the event object queue so that other objects can be appended. After the background thread has claimed ownership of the "head" object in the queue, it creates a binary representation of the object in a memory buffer.

At some point during the process of serializing objects from the event object queues 350, 351 to the event object files 352, 353, the application server closes the current event object files and begin serializing data into a new file. This process can be configured to occur, for example, every fifteen minutes. After a selected period of time has passed, an import thread on the event collector 102 makes a request to retrieve all of the closed event object files from the application server or gateway. The import thread running on the event collector is preferably running within a Windows NT service. It can be noted that all of the configurable options discussed above (e.g. sleep times) are preferably defined within that Windows NT Registry. In addition, the priority of the thread output buffer cache sizes can also be set in the Registry.

FIG. 7 is a block diagram which illustrates retrieving an event object file, converting it to an export format file which is then imported into a database server. As shown, the event object file 353' is acted upon by two export threads 600, 602. Each export thread removes specific objects from the event object file 353 and converts them into particular export format file configurations 604, 606. However, it should be recognized that the export threads normally work on separate copies of the same event object file 352', 353' as created by services within the event collector 102 so that they will not block one another.

The export converter thread 600 converts the event object file 353' into an export format file 604 whereas the export converter thread 602 converts the event object file 353 into an export format file 606. As can be seen, export format file 604 differs from export format file 606 although they both derive from the event object file 353'. As explained above, each export converter thread running on the event collector can process the same event object file into different export format file configurations.

Once the export format file 604 has been created and saved to a particular subdirectory on the event collector server 102 it is thereafter imported into an import database 608 in a billing server 108.

Now that the export format files have been created they are made available to various processes within the distributed network. For example, the billing server 108 can import the export format files. One type of billable event data that might be sent to a billing computer, for instance, would be the number of file downloads that are made by a particular customer. Because a retail price may need to be charged for the downloaded software, this type of event would be retrieved by a billing server and then used to calculate download charges for a customer.

Other processes within the network, such as a marketing computer, can access the export format files and filter out the data that pertains to marketing decisions. An example of data that might be useful to the marketing department of a company could be, for example, the number of users who have accessed a particular bulletin board forum. By knowing how many users have accessed a particular bulletin board, the marketing department can decide how strong or weak of an advertising campaign to make for that area.

B. Importing Export Format Files into a Billing Server

Figure 8:
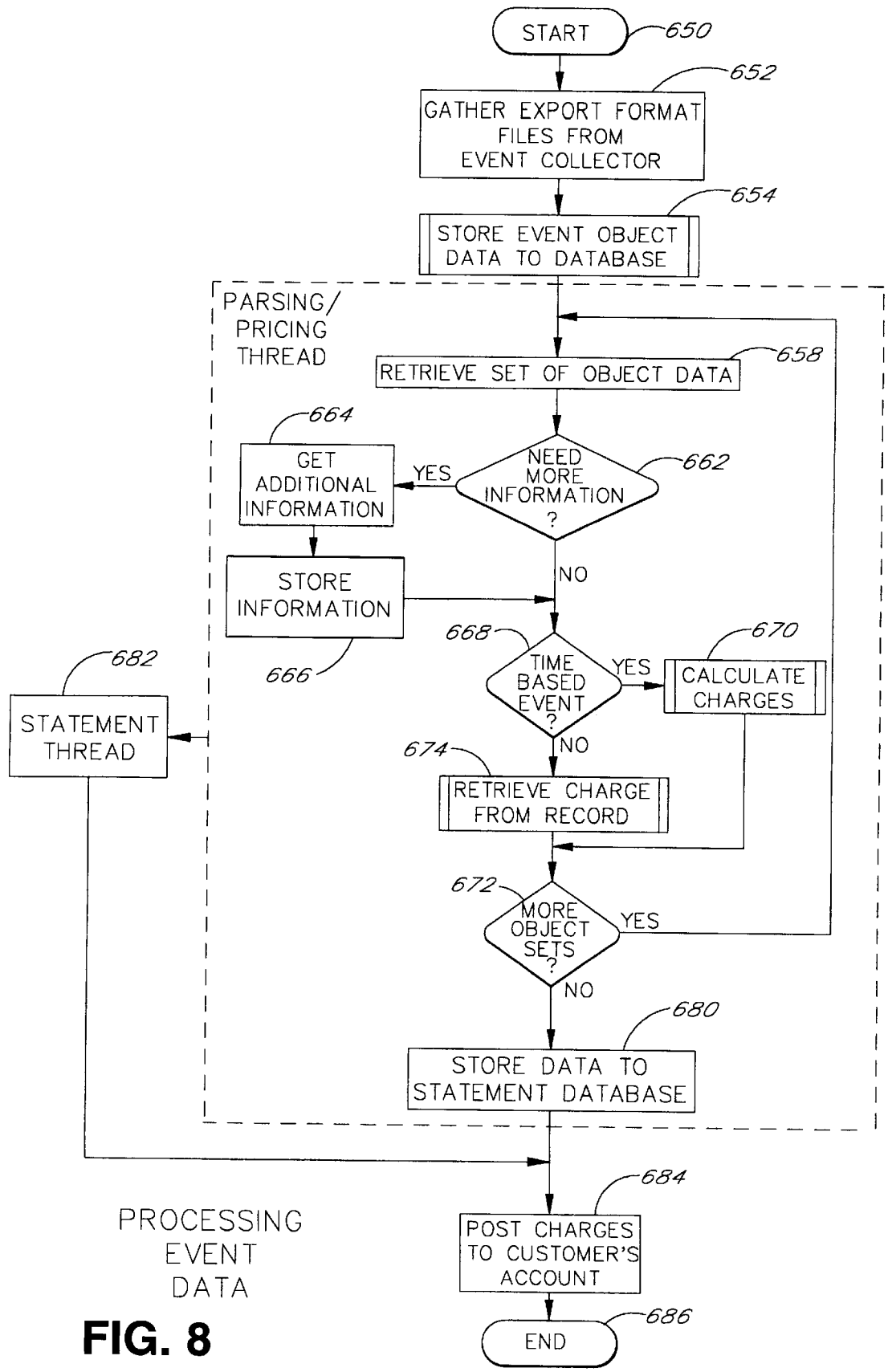
FIG. 8 is a flow diagram showing further details of the parsing and pricing states of FIG. 5.

FIG. 8 provides a flow of the process that occurs on a billing server when it gathers export format files from an event collector and posts charges to a customer's account. This process begins at a start state 650 and moves to a state 652 where export format files from the event collector 102 (FIG. 2) are gathered for importing to the billing server.

The export format files are gathered when an import thread (SQLIMP.EXE) on the database server searches the export subdirectories on the event collector 102 for export files. Many import threads (not shown) reside on the database server for retrieving export format files from specific subdirectories on the event collector 102 and performing state 652. As can be envisioned, each database can use a different import thread so that the data in the export format files are formatted properly for the target database. As discussed previously, export threads on the event collector 102 store export format files to various subdirectories in the event collector depending on their intended destination and format. It is anticipated that the event collector 102 could contain dozens of subdirectories, each one containing a type of export format file.

Once an export format file is gathered from the event collector 102 at state 652, the records in that file are stored to the billing database at a state 654. The process of storing event object data to the billing database is a two-step process and is discussed in more detail with reference to FIG. 9. Preferably, the database is a relational database supporting ANSI Structured Query Language (ANSI SQL). Other database systems may work without departing from the true spirit of the present invention.

A number of parsing and pricing threads such as shown in phantom at 656 run concurrently on the database server 104 with the import thread and begin to act on records in the billing database once they have been imported by the import thread. The parsing thread first retrieves a set of records containing event object data at a state 658 from the billing database. One set of records usually includes objects that have the same event ID and event version ID. In this manner, all of the events retrieved at state 658 would have to be the same event object type.

For example, the parsing thread 656 may retrieve only event objects that represent file downloads at state 658. Thus, the thread would know it was only acting on data from a particular type of event rather than data from various event object types. The maximum number of records that is retrieved at state 658 can be predetermined to result in a high throughput, without causing concurrency problems such as blocking locks or deadlocks. For example, the parsing thread can be configured to retrieve data from no more than 400 records at state 658. This is a fail-safe mechanism to keep the system from crashing due to a single transaction exceeding the maximum size of the transaction log by being forced to handle too many records at one time. The following pseudocode outlines the process of parsing records from the billing database.

Connect to SQL Server

```
Do While   TRUE
    Do While still billable events to parse
        Select distinct event id, event version id, parsing
            procedure for unparsed events with message number = 0
            (not previously flagged for error) into
            internal array
        For each parsing procedure
            Select up to 400 rows with matching event_id
            /event_version_id into temp table
            Begin Transaction (process billable events in temp
                table)
                Flag all batched billable events having
                invalid service names with identifying
                message number
                    Parse all unflagged billable events into
                    service_event, transaction and time tables
                    Archive all parsed billable events in billing
                    history database
                    Delete parsed billable events from batched
                    billable event table
            Commit Transaction
            Log process to Process Log
        Next
    END DO
    Sleep a specified interval
END DO
Disconnect from SQL Server
```

Still referring to FIG. 8, once a set of records having event object data has been retrieved at state 658, the retrieved data set is read at state 660 and a determination is made at a decision state 662 whether more information is needed for any row within the data set. If more information is needed at decision state 662 then the additional information is retrieved at a state 664.

Additional information may be necessary when the event object only knows, for example, the name of a customer but not a customer ID number. Similarly, data such as a customer's address or phone number which is not stored within the event object may be necessary for further processing and can be retrieved from a customer profile. The customer profile is a series of tables within the database that holds information about a particular customer. Once the additional information has been retrieved at state 664 that information is stored to memory at state 666.

Before the information has been stored, the parsing thread determines whether this particular event was a time-based event or not at a decision state 668. If, however, no additional information was needed at the decision state 662 then the process continues directly to a decision state 668 to query whether the current record has derived from a time-based event. After determining if the event is a transaction or time-based event, the parsing thread stores all of the retrieved data to a billing database. The billing database can reside on the billing server 108 or another computer in the network.

If the current record does derive from a time-based event, the pricing thread calculates charges at a process 670. The process 670 of calculating charges for a time-based event is discussed in more detail in reference to FIG. 11. Once the process 670 has calculated charges for events in the current data set, a determination is made at a decision state 672 whether more records exist in the data set retrieved at the state 658.

If, however, the current record is not a time-based event at decision state 668, then the event is assumed to be a transaction-based event. As discussed previously, transaction-based events occur when a customer takes a particular action, such as downloading a file. The price of the downloaded file can be stored within the event object and eventually placed in a record in the billing database. Thus, the charges for transaction-based events are retrieved from the record at a process 674. The process of retrieving charges from transaction-based event data is discussed in more detail in reference to FIG. 10. Once charges are retrieved from the record at process 674 then a determination is made at decision state 672 whether more records exist.

A subprocess 682 of the pricing thread posts charges to a customer's account at a state 684. Once charges have been posted to a customer's account, all calculated charges are stored in a billing statement database (not shown). The process of billing a customer ends at an end state 686.

Figure 9:
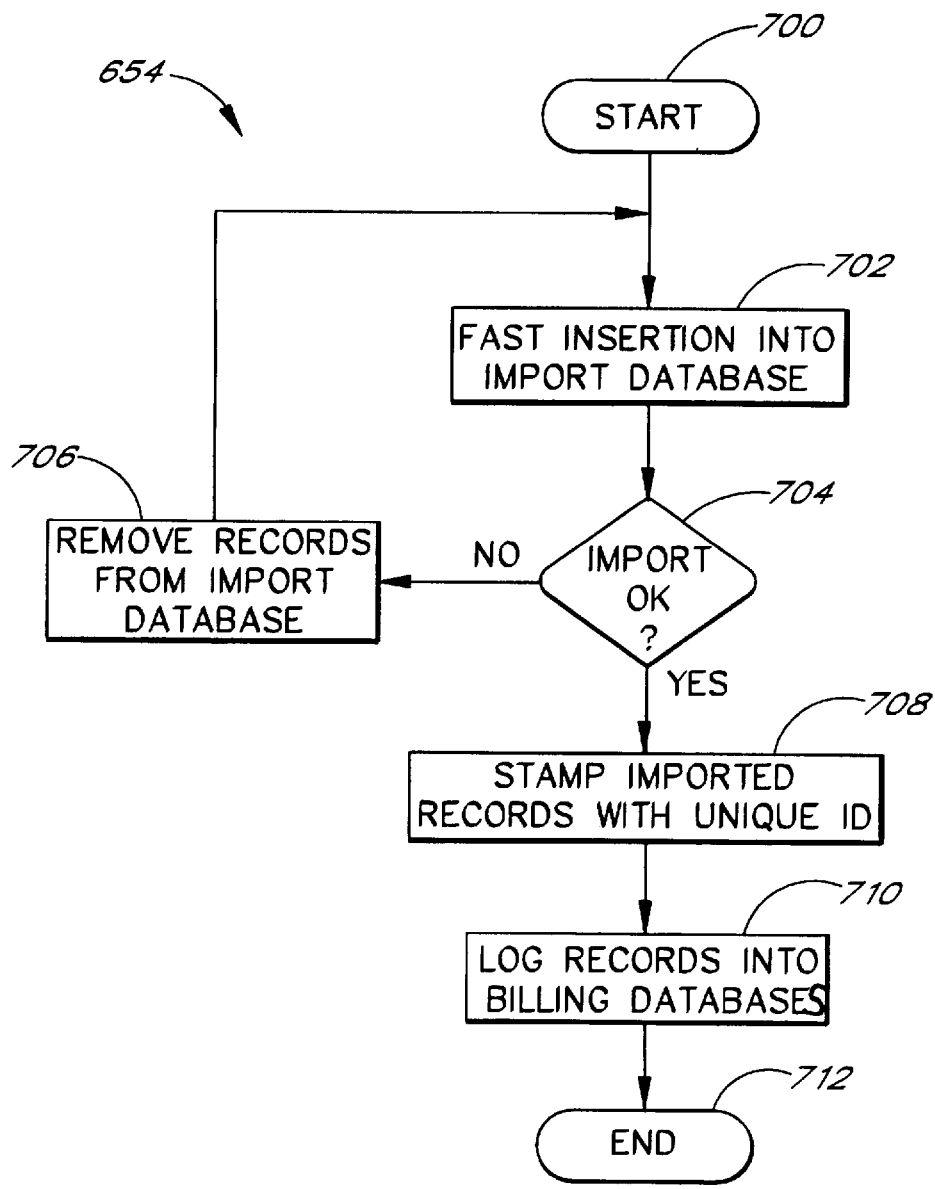
FIG. 9 is a flow diagram showing the process of storing event object data to a database of FIG. 8.
Figure 10:
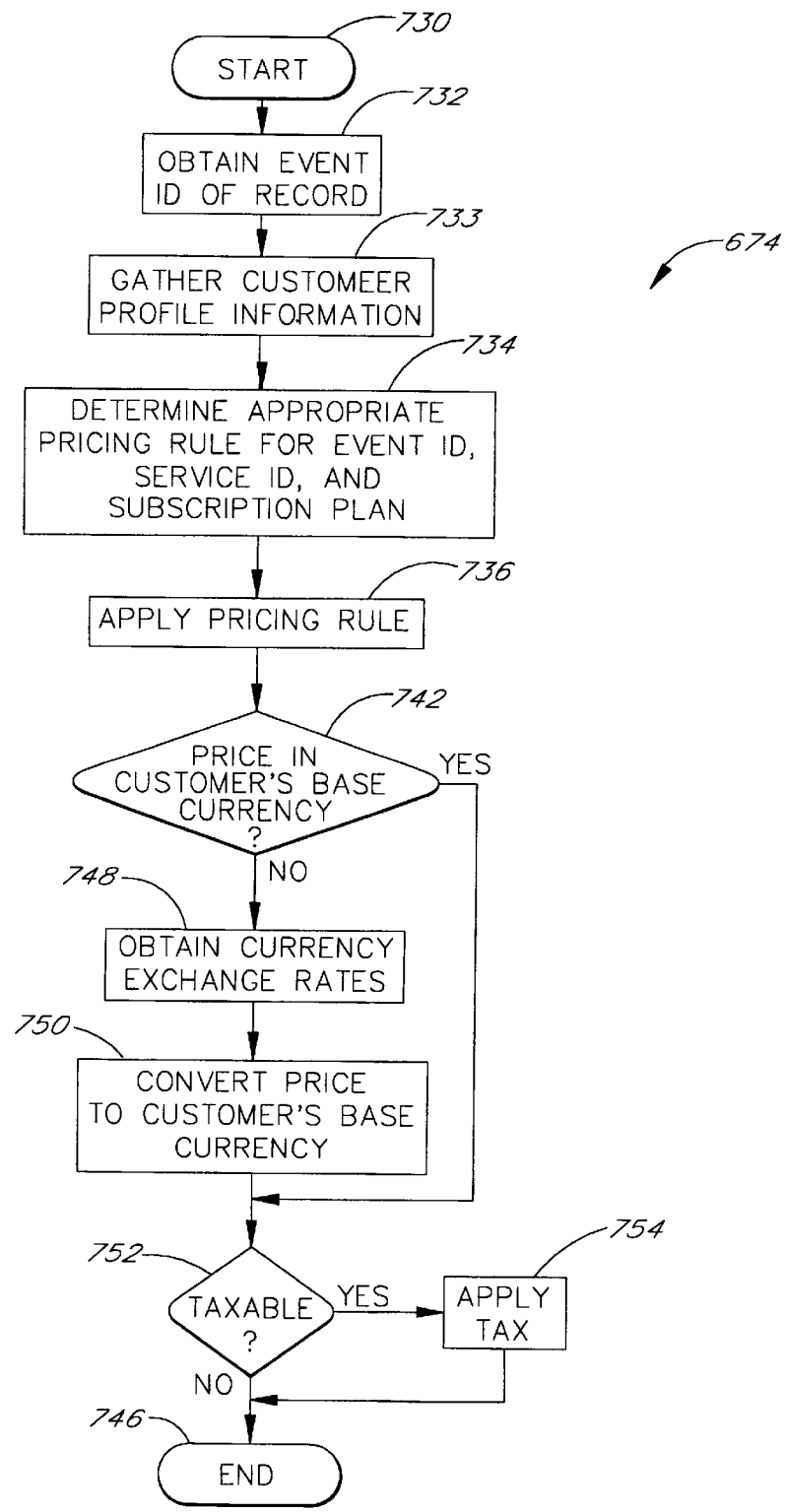
FIG. 10 is a flow diagram showing the process of retrieving charges from a record of FIG. 8.
Figure 11:
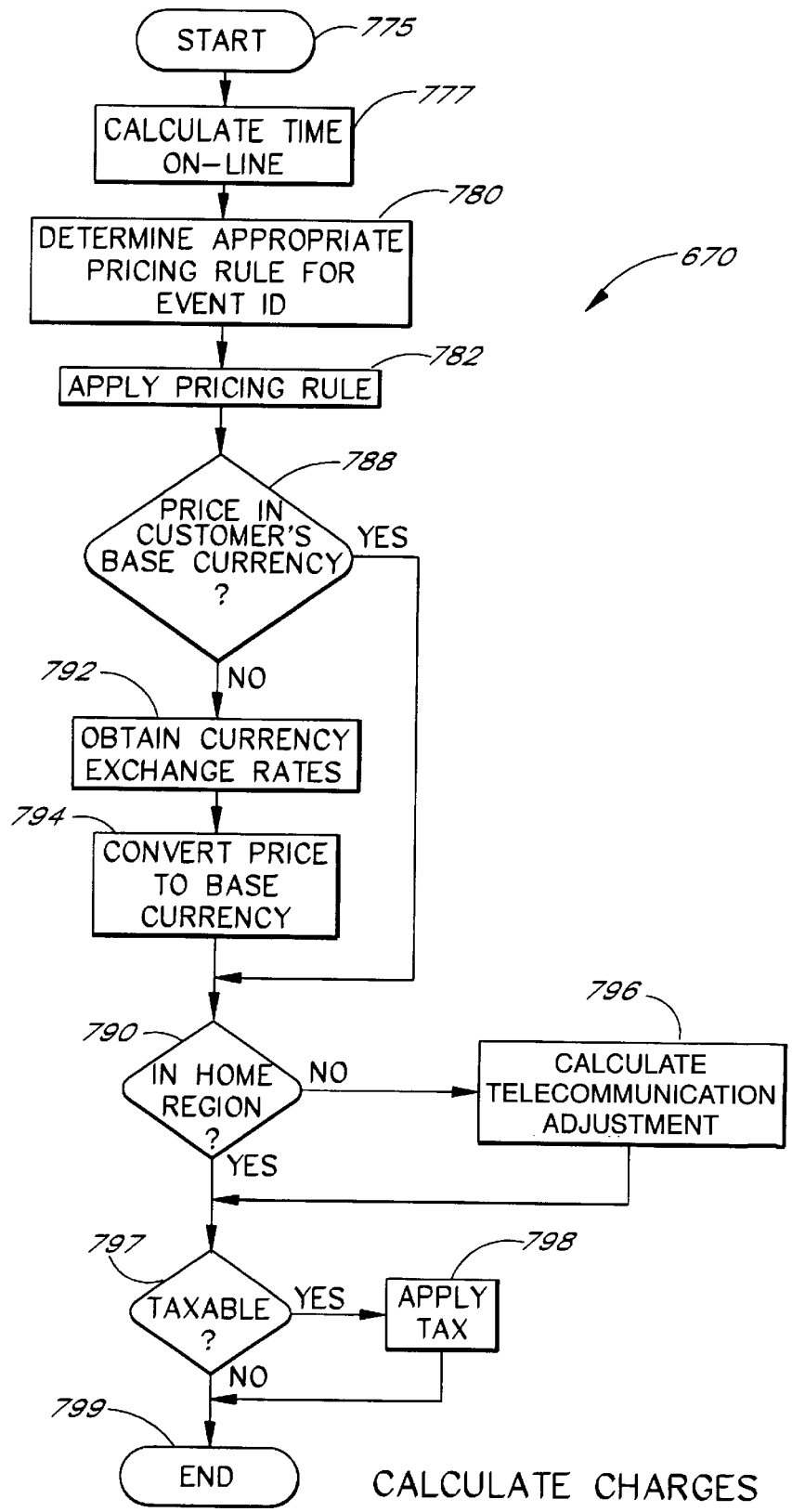
FIG. 11 is a flow diagram showing the process of calculating charges of FIG. 8.

While FIG. 8 provides an overview of the billing process of the present invention, FIGS. 9–11 provide more details on the individual processes identified in FIG. 8. The process 654 of storing event object data to a database is discussed in more detail below in reference to FIG. 9.

The process 654 of storing event object data to a database begins at a start state 700 and moves to state 702 wherein data from the export format file is inserted into an import database on the billing server. The import that takes place at state 702 is a fast import process with no transaction-logging. The non-logged import is a transaction wherein a history log is not kept for each record insertion. Transaction logging is a mechanism used in relational database systems to record the update of information within the database such that the data can be returned to a previous state (e.g. rolled back) if an error occurs. This import is designed to rapidly move data from the event collector 104 into the import database. After data from the export format file has been inserted as rows into the import database 608 (FIG. 7) at state 702, a determination is made at a decision state 704 whether the import completed without errors.

If the import does not complete without errors then all new records that were placed in the import database are deleted at a state 706 and the process loops back to the state 702 wherein the records are re-imported into the database after examination. If the import does complete without errors at decision state 704 then each row in the database is stamped with a unique ID number at a state 708 and stored as a logged transaction into the billing database at state 710. The unique identifier that is stamped on each record at state 708 preferably uses a variable-length binary string as provided by the "timestamp" datatype within the Microsoft SQL Server. Briefly, the unique identifier that is stamped at state 708 is a monotonically increasing counter that is unique across all records in a database. Preferably, the unique ID number is an eight byte variable-length binary string.

As each set of records is moved from the import database at state 702 through the billing database and eventually to the billing statement database during state 710 it is logged into a billing history database (not shown) so that each event can have its steps retraced through the billing system. Since the unique ID number is not repeated for any record in the billing database 838 (FIG. 12), transactions can be traced back to their original import file. Once records have been logged into the billing database 838 (FIG. 12) at state 710, the process 654 ends at an end state 712.

FIG. 10 is a flow diagram that shows a more detailed view of the process 674 of retrieving billable charges for transaction-based events from a record in a billing database. The process 674 begins at a start state 730 and proceeds to state 734 where the event ID and event version ID of the record are obtained. Once the service Id and event ID of the record is known (from the event object) and the customer profile (subscription plan, base currency) is retrieved at state 733, an appropriate pricing rule for that event ID is determined at state 734. For example, if the event ID points to a file download type of event, then the pricing rule may instruct the billing system to charge that particular customer a discounted price from the price that is stored in the event object data.

The following pseudocode is one example of a pricing rule.

---

Look up customer profile for account (subscription plan, base currency, billing anniversary day)
Look up customer profile for sponsoring account if account is sponsored (subscription plan, base currency, billing anniversary day)
Look up implied decimals in currency table for pricing currency and billing (base) currency (ie. US Dollars 2, Italian Lira 0)
Calculate next billing date for transaction (anniversary date)
Flag events with invalid Owner or Account IDs, invalid next billing dates or invalid base currency
Look up base amount pricing rule based on event id, service id, currency and subscription plan
Look up surcharge pricing rule and discount pricing rule based on event id, service id, currency and subscription plan
Calculate pre-tax pricing amount by applying pricing rules based units and unit of measure
Round unit price and pre-tax pricing amount based on pricing currency's implied decimals
If time-based event
    Filter out time-based events not subject to telecom adjustments (close connection events only)
    Determine region of world from which customer accessed on-line service based on telecom PAD address
    Delete rows where home region of world (based on customer profile) equals access region of world
    Look up adjustment rate in telecom adjustment table based on access and home regions
    Calculate telecom adjustment amount by multiplying adjustment rate * units
    Round telecom adjustment amount based on pricing currency's implied decimals
    Generate telecom adjustment billable event and insert into normal billable event flow
End If
Look up appropriate exchange rate between pricing currency and billing currency
Calculate pre-tax billing amount by multiplying pre-tax pricing amount * exchange rate
Round pre-tax billing amount based on billing currency's implied decimals
Flag events with invalid exchange rates
Look up tax rate for jurisdiction (US based on country/postal code/threshold amount, Intl VAT based on country/threshold amount)
Calculate tax amount by multiplying pre-tax-billing amount * tax rate
Round tax amount based on billing currency's implied decimals
Calculate total billing amount by adding pre-tax billing amount to tax amount

---

Thus, the system of the present invention has the flexibility to give one customer a discounted price for the downloaded file while selling the same service to another customer at a discount. The pricing rule is designed to give maximum flexibility to pricing particular events that occur within the system.

Once the pricing rule has been determined at state 734 it is applied at state 736 so that an actual price is calculated for the particular event ID and customer. The process 674 then determines whether the price was in the customer's base currency at a decision state 742. If a determination is made at decision state 738 that the particular event ID does not correspond to a taxable product then the process 674 moves directly to decision state 742 wherein a determination is made whether the price charged was in the customer's base currency.

The base currency of a particular customer is defined within the network system. For example, all customers in the United States will have a base currency of U.S. dollars. However, customers residing in France would have a base currency of French francs. If the price is in the customer's base currency at decision state 742 then the process 674 ends at an end state 746.

However, if the customer's base currency does not correspond to the price charged at state 736 then currency exchange rates 28 (FIG. 1) are obtained from VISA or another currency exchange rate provider at a state 748. Once currency rates have been obtained at state 748 the price of the event as determined by the pricing rule at state 734 is converted into the customer's base currency at a state 750. After the price has been converted to the appropriate base currency at state 750, a determination is made at state 752 whether the particular event is taxable. If the event is taxable, then tax is applied at a state 754 and the process ends at an end state 746. If the event is not taxable, then the process 654 moves directly to the end state 746. The process 674 of pricing a transaction-based event is illustrated below in the following pseudocode.

---

Connect to SQL Server
Do While TRUE
    Do While still service events to price and post
        Select up to 400 transaction events into temp table
        Begin Transaction (process service events in temp table)
        Assign unique fee id
        Flag all service events with invalid currency codes with identifying message number -continued

```
            Assign billing account ID, owner ID, billing
                anniversary and subscription plan for
                sponsored accounts
            Assign billing period end date
            Flag all operations events with invalid owner
                IDs, account Ids or billing dates with
                identifying message number
            Assign billing currency code, exchange rate and
                billing amount
            Flag all service events with invalid exchange rates
                with identifying message number
            Apply tax
            Post service fee events to
                billing_statement . . . fee
            Create owner and account balance records for current
                billing period end date as required
            Update owner balances for non-free accounts
            Update account balances for non-free accounts
            Archive posted service events in billing history
                database
            Delete posted service events
            Commit Transaction
            Log process to Process Log
        End Do
        Sleep a specified interval
End Do
Disconnect  from SQL Server
```

The process 670 of pricing a time-based event is illustrated below in the following pseudocode.

```
Do While    TRUE
            Do While still service events to price and post
                Select up to 400 time events into temp table
                    (units are difference in minutes between
                    transaction begin / end datetimes)
                Begin Transaction (process service events in temp
                    table)
                    Assign unique fee id
                    Flag all service events with invalid currency
                        codes with identifying message number
                    Assign billing account ID, owner ID, billing
                        anniversary and subscription plan for
                        sponsored accounts
                    Assign billing period end date
                    Flag all operations events with invalid owner IDs,
                        account Ids or billing dates with identifying
                        message number
                    Apply telecom adjustments (surcharges /
                        discounts)
                    Flag all service events with telecom adjustment
                        errors with identifying message number
                    Assign billing currency code, exchange rate and
                        billing amount
                    Flag all service events with invalid exchange rates
                        with identifying message number
                    Apply tax
                    Post service fee events to
                        billing_statement . . . fee
                    Create owner and account balance records for
                        current billing period end date as required
                    Update owner balances for non-free accounts
                    Update account balances for non-free accounts
                    Archive posted service events in billing history
                        database
                    Delete posted service events
                Commit Transaction
                Log process to Process Log
            End Do
            Sleep a specified interval
End Do
Disconnect  from SQL Server
```

FIG. 11 is a flow diagram that shows details of the process of calculating charges for a time-based event. The process 670 begins at a start state 775 and then moves to state 777 wherein the amount of time a customer on been on-line is calculated. The amount of time on-line can be calculated from the properties of the event object. Once the amount of on-line time has been calculated at state 777 the process 670 determines the appropriate pricing rule or the selected event ID at state 780. For example, a pricing rule may state that the selected event ID has an hourly charge of $10.00 before 5:00 p.m. and $20.00 for all events posted after 5:00 p.m. Once the pricing rule has been determined at state 780 the pricing rule is applied at state 782. Applying the pricing rule at state 782 involves saving the calculated price to the billing database.

Once the pricing rule has been applied at state 782 a determination is made at decision state 788 whether the price charged is in the customer's base currency. As discussed above, the customer's base currency is determined by the system. The customer's base currency will be in U.S. dollars for all those people residing within the United States. In this instance, if the price applied at state 782 is in U.S. dollars then the base currency would correspond to the price charged.

If the price charged is in the customer's base currency at decision state 788 then a determination is made at decision state 790 whether or not the customer accessed the network from their home region. The home region is also a parameter stored within the customer's profile on the distributed network. Normally, a customer's home region is the country of residence. For example, the home region for a person residing within the United States would be the United States. The importance of the home region is discussed below.

If the price is not in the customer's base currency at decision state 788 then currency exchange rates 28 (FIG. 1) are obtained from VISA or another provider at state 792 and the price applied at state 782 is converted to the customer's base currency at state 794. This conversion process is discussed below in more detail. Once the conversion has taken place at state 794 the process 670 moves to decision state 790 to determine whether the customer is in his home region. If a customer did not access the network from their home region at the decision state 790 then a telecommunications adjustment (surcharge or discount) is calculated at a state 796.

A customer will be charged an additional surcharge for accessing the on-line system from a higher priced region of the world. For example, if a customer resides in the U.S., but accesses the distributed network from Europe, then a telephone surcharge will be applied for every minute that the customer stays on-line. Similarly, if a customer whose home region is Europe accesses the network from the United States then a credit will be applied for every minute on-line.

These telecommunication adjustments are mostly designed to make up the difference in costs for allowing a customer to access the network from a country outside their home region. Network costs are embedded within a customer's hourly connect-time rate. Accessing the network from a region whose network costs are not reflected in the customer's hourly rate will result in a telecommunication adjustment. Once the telecommunication adjustment has been calculated at the state 796 the process 670 moves to a decision state 797 wherein a determination is made whether the charges are taxable. If the charges are taxable at a decision state 797 then tax is applied at a state 798 and the process 670 ends at an end state 799. However, if the price applied at the state 782 is not taxable then the process 670 moves directly from the decision state 797 to the end state 799.

A block diagram of the presently preferred process used to charge customers in different countries for access to the on-line network of a merchant is discussed below in reference to FIG. 12. As shown in the block diagram of FIG. 12, customers 828a, 828b, 828c are located in different countries and all access the on-line network through a gateway 830. After connecting to the gateway 830, the customer accesses various areas of the on-line network until event data 834 is generated by the application servers 832a, 832b or the gateway 830. The event data 834 is then sent to a transactions table 836 within a billing database 838.

Event data 834 that is sent to the transactions table 836 is then converted into the customer's base currency by a currency converter 840. The currency converter 840 receives currency rates that are calculated at process 842 on a daily basis. The billing database 838 also contains a monthly charge table 844 which holds the amount and base currency for every customer 828. The amounts stored in the monthly charge table 844 are in the customer's base currency and therefore do not need to be converted by the currency converter 840.

Figure 12:
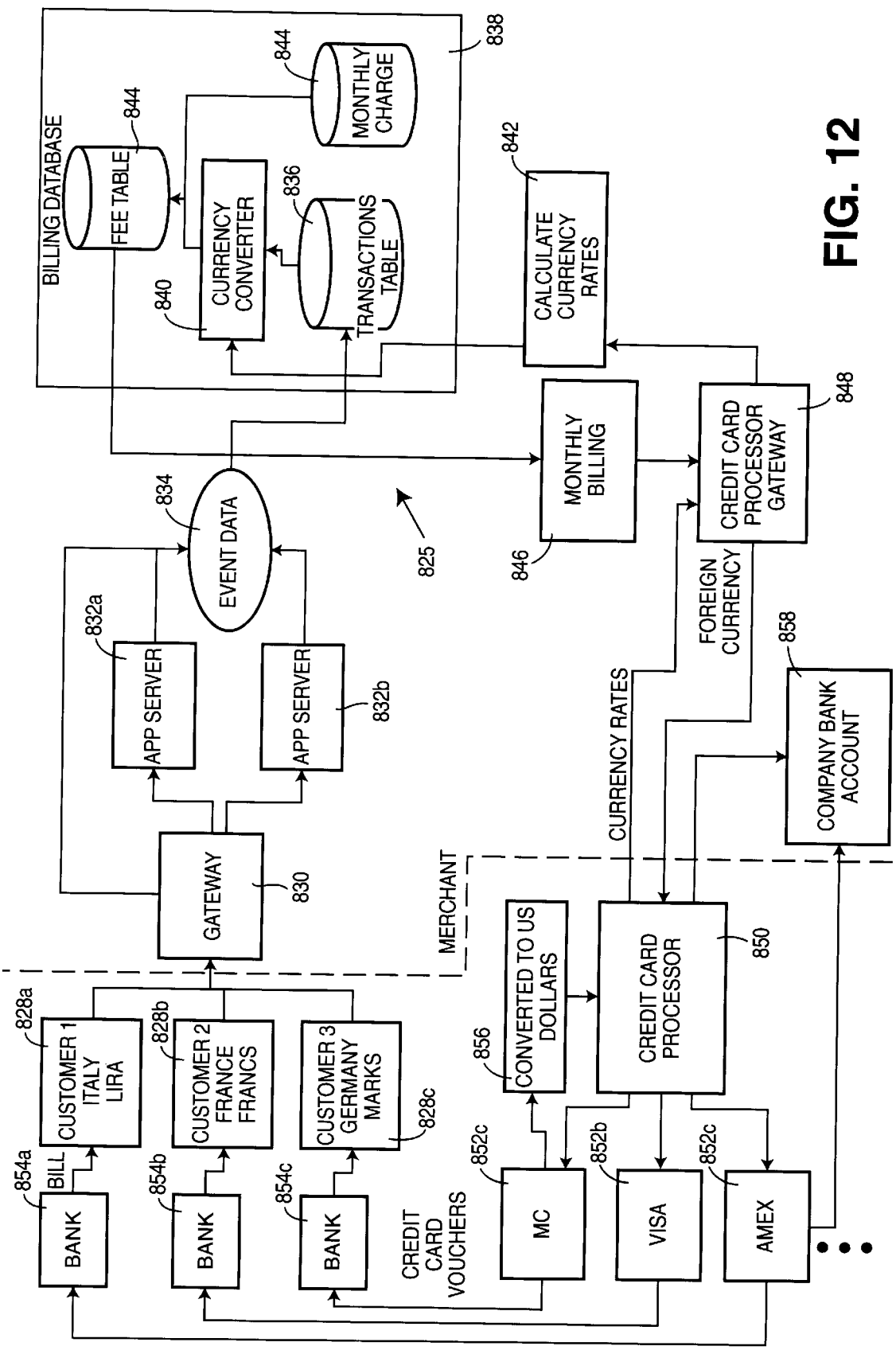
FIG. 12 is a block diagram showing the process of using a currency converter to bill customers that reside in different countries.

As shown in FIG. 12, the currency-converted data or the monthly charges are sent to a fee table 844 which compiles all of these transactions. The compiled transactions are then sent to a monthly billing process 846 within the billing system 825. The monthly billing process 846 forwards billing data, including billing data in local currency, through a credit card processor gateway 848 to a credit card processor 850, such as NaBANCO. As can be envisioned, the credit card processor gateway 848 sends billing data in foreign currency from the fee table 844 to the credit card processor 850. In addition, the credit card processor 850 sends basic currency rates to the calculate currency rates process 842 through the credit card processor gateway 848. Calculations are made by the process 842, as discussed below, to improve throughput by storing and making table look-ups.

Once the credit card processor 850 has received the customer fee information, it passes that data to the appropriate credit card company 852a, 852b, 852c. As has been discussed previously, the credit card processor 850 acts as a clearing house to process transactions for several credit card companies such as, for example, Mastercard, Visa and American Express. The credit card companies 852 then send the appropriate charge, in the correct local currency to one of the banks 854a, 854b, 854c in the customer's home country. The bank 854 then bills each customer for the amount of currency that was forwarded from the fee table 844.

When a customer 828 pays their bill to the bank 854, it is credited to the credit card company 852 in local currency and then can be converted to U.S. dollars 856. The customer's payment, now in U.S. dollars is then sent to the credit card processor 850 which makes payment to the company bank account 858. However, it should be noted that particular credit card companies 852c may collect charges in U.S. dollars and will therefore not need to go through a currency conversion process 856.

Derivation of Exchange Rates

The daily billing process within the billing system 825 will import a file from a credit card processor, such as NaBanco, with VISA exchange rates for each supported foreign currency. The rates are stated as the US$ equivalent of 1 unit of foreign currency. Rates are normally published by 9:00 pm EST (6:00 pm PST) and take effect immediately. The exchange rate file (aka foreign currency file) is presently available Monday through Friday at 9:00 pm EST, including holidays. No exchange rate file is available presently on Saturday or Sunday.

Exchange rates are initially loaded with an expiration date of one week from the effective date. When the next file is retrieved, the expiration dates for the last set of exchange rates are adjusted to the effective date of the new set of exchange rates (less 2 milliseconds). The reasons for setting expiration dates for the latest set of exchange rates to be one week in the future are threefold:

A. Exchange rates published on Friday are effective through the following Monday B. If Daily Billing does not run as expected, events still flow through the system and are posted to the Online Statement (using old, but still viable exchange rates)

C. If exchange rate file is not published as expected on a weekday, events still flow through the system and are posted to the Online Statement (using old, but still viable exchange rates)

To increase the speed at which exchange rates are applied within the pricing threads, all combinations exchange rates for all 19 Select currencies will be derived and stored in the billing_statement . . . exchange_rate table. Exchange rates derived from the VISA exchange rates are stored in a unsigned int datatype column in the database which has 10-digit precision. Rates are presently rounded as follows:

D. Rate is rounded to 4 digits to the right of the decimal point if rate has 3 or less significant digits to the left of the decimal point. For example, rate of 0.155567 will be rounded to 0.1556.

E. Rate is rounded to less than 4 digits to the right of the decimal point if rate has more than 3 significant digits to the right of the decimal point. For example, rate of 1183.6333 will be rounded to 1183.633.

For example, given VISA exchange rates:

| German Mark | 0.5230 | (1 US$ = $0.5230) |
| French Franc | 0.2570 | (1 US$ = $0.2570) |
| Italian Lira | 0.0006 | (1 US$ = $0.0006) |

The service that prepares statements, the Daily Billing service would then generate the following rows in the billing_statement . . . exchange_rate table:

| From Currency | To Currency | Exchange Rate | Derived From |
| --- | --- | --- | --- |
| German Mark | US Dollars | 0.5230 | VISA Exchange Rate |
| French Franc | US Dollars | 0.2570 | VISA Exchange Rate |
| Italian Lira | US Dollars | 0.0006 | VISA Exchange Rate |
| US Dollars | German Mark | 1.9120 | 1/VISA Exchange Rate (rounded to 4 decimal positions) |
| US Dollars | Fr. Franc | 3.8911 | 1/VISA Exchange Rate |

21
-continued

| From Currency | To Currency | Exchange Rate | Derived From |
|---|---|---|---|
| US Dollars | Ital. Lira | 1666.667 | (rounded to 4 decimal positions) 1/VISA Exchange Rate (rounded to 7 significant digits) |
| German Mark | Fr. Franc | 2.0350 | German Mark to US Dollars rate* US Dollars to French Franc rate (rounded to 4 decimal positions) |
| German Mark | Italian Lira | 871.6668 | German Mark to US Dollars rate* US Dollars to Italian Lira rate (rounded to 4 decimal positions) |
| French Franc | German Mark | 0.4914 | Fr. Franc to US Dollars rate* US Dollars to German Mark rate (rounded to 4 decimal positions) |
| French Franc | Ital. Lira | 428.3334 | Fr. Franc to US Dollars rate* US Dollars to Italian Lira rate (rounded to 4 decimal positions) |

22

Recomputation of Taxes due to Subscription Plan Change

Taxes are calculated based on the tax rate in effect at the time of the transaction based on the subscriber country/postal code and the amount of the transaction (tax rate thresholds). When a subscriber changes their home region in the middle of a billing period, a new subscription plan is assigned which may result in a new base currency. The following example explains how a subscription plan change affects the calculation, billing and payment of taxes.

Given the following:

Subscriber's billing anniversary=Jun. 15

End of fiscal period=Jun. 30

French tax rate=10%

Italian tax rate=20%

Exchange rate between French Francs and Italian Lira is 1 FF=100 ITL

Subscriber changes their billing country from France to Italy on Jun. 3

(future subscription plan is priced in Italian lira) Transaction history for billing period May 16–Jun. 15:

| Date | Description | Price Amount/ Currency | Exchange Rate/ Pre-Tax Bill Amt | Tax Rate/ Tax Country | Tax Amount/ Currency | Billing Amount/ Currency |
|---|---|---|---|---|---|---|
| 5/17 | Download file XYZ | 100 FF | 1/100 FF | 10%/France | 10 FF | 110 FF |
| 6/05 | Download file XYZ | 100 FF | 1/100 FF | 20%/Italy | 20 FF | 120 FF |

On Jun. 15, the subscriber will be shown as in arrears for these transaction charges in Italian lira, so the fee table is updated to reflect the following:

| Date | Description | Price Amount/ Currency | Exchange Rate/ Pre-Tax Bill Amt | Tax Rate/ Tax Country | Tax Amount/ Currency | Billing Amount/ Currency |
|---|---|---|---|---|---|---|
| 5/17 | Download file XYZ | 100 FF | 100/10000 ITL | 10%/France | 1000 ITL | 11000 ITL |
| 6/05 | Download file XYZ | 100 FF | 100/10000 ITL | 20%/Italy | 2000 ITL | 12000 ITL |

Note that tax rates remain the same. Also note that the tax on May 17 transaction is payable to France taxing authorities and tax on Jun. 5 transaction is payable to Italian taxing authorities.

On Jun. 30 (fiscal period end), we will report taxes by jurisdiction to the corporate finance department. All taxes will be reported to MS Tax in the currency in which they will be paid. Therefore, Period Billing will multiply the price ★ exchange rate on date of transaction for reporting currency ★ tax rate.

In the example below, the calculations would be:

| Date | Description | Price Amount/ Currency | Exchange Rate/ Pre-Tax Bill Amt | Tax Rate/ Tax Country | Tax Amount/ Currency | Payable To |
|---|---|---|---|---|---|---|
| 5/17 | Download file XYZ | 100 FF | 1/100 FF | 10%/ France | 10 FF | French tax authorities |
| 6/05 | Download file XYZ | 100 FF | 100/10000 ITL | 20%/Italy | 2000 ITL | Italian tax authorities |

V. CONCLUSION

The billing system of the present invention provides important advantages for customers that reside in many countries. Because a customer can be charged in their base currency, they are protected against currency fluctuations.

In addition, the objects in this system that are generated are not transmitted one at a time throughout the system. Rather, they are transferred as event object files which can contain hundreds or thousands of event objects. Similarly, data is moved through the billing system as sets of data, leading to greater efficiency and thus higher throughput. The efficiency of the billing system is greatly enhanced by transferring thousands of objects through the system at a time instead of moving only one object at a time.

Although the invention has been described with reference to specific embodiments, the description is intended to be illustrative of the invention and is not intended to be limiting. Various modifications and applications may occur to those skilled in the art without departing from the true spirit of the invention as defined in the appended claims.

What is claimed is:

1. A method for billing in a computer network having a host data center, a plurality of network customers, and multiple local currencies at which transactions are charged to the network customers, the host data center generating a charge to a credit card account of a network customer in response to a transaction comprising the host data center providing a network resource, said method comprising the steps of:
   receiving, by the host data center, notification of the transaction;
   determining, a first local currency for billing the credit card account of the network customer for the transaction;
   calculating a transaction charge price expressed in terms of the first local currency by applying a currency exchange rate to a stored price expressed in a second currency differing from the first local currency; and
   transmitting, by the host data center after the calculating step, the transaction charge price to a credit processor.

2. The method of claim 1, wherein the network customer is billed by the credit card company in the first currency.

3. The method of claim 1, wherein the transaction is a periodic transaction or a file download transaction.

4. The method of claim 1, wherein the transaction is associated with an event.

5. The method of claim 1 further comprising the steps of:
   storing within a billing database a table of preset charges to customers, wherein each preset charge entry is expressed in a local currency with which a corresponding network customer is billed; and
   reading, from the billing database, a preset charge expressed in terms of a local currency for a network customer; and
   transmitting, by the host data center, the preset charge to the credit processor.

6. The method of claim 1 further comprising the step of providing, by the host data center, real-time billing statements including the transaction charge price transmitted to the credit process.

7. A billing system for utilization on a network providing access to resources by networked customers and billing the networked customers for the resources in multiple local currencies in accordance with specified currencies for the networked customers, comprising:
   a credit system;
   a data center networked to computing devices of identified network customers and the credit system, the data center comprising:
      at least one data access server for providing access to data items of commercial value having associated price information and transmitting a data item in response to a request from an identified network customer;
      at least one billing database maintaining data representative of: identified network customers and local currencies with which particular identified network customers are associated, currency exchange rates, and transmissions of data items of commercial value from the data center to computing devices of identified network customers,
      transaction charge computing, communicatively coupled to the at least one billing database, for determining a particularized local currency price for transmitting a data item, the particularized local currency price being expressed in the form of a first local currency associated with a requesting network customer and resulting from applying a currency exchange rate to a stored price for the data item which is expressed in a second currency differing from the first local currency, and
   a billing facility for submitting to the credit system the particularized local currency price for transmitting the data item.

8. The system of claim 7, wherein the credit system includes credit card processing.

9. The system of claim 7, wherein the credit system provides credit card charges to banks.

10. The system of claim 7, wherein the computing devices comprise personal computers.

11. The system of claim 7, wherein the computing devices comprise interactive television devices.

12. The system of claim 7, wherein the computing devices comprise wireless telephones.

13. The system of claim 7, wherein the data items include software programs.

14. The system of claim 7, wherein the data items include content.

15. The system of claim 14, wherein the content comprises video data.

16. The system of claim 14, wherein the content comprises audio data.

17. The system of claim 14, wherein the content comprises image data.

18. The system of claim 7, wherein the data transmissions include file downloads.

19. The system of claim 7, wherein the data center additionally comprises price information associated with periodic billing items.

20. The system of claim 19, wherein the period for billing is monthly.

21. The system of claim 19, wherein the periodic billing is associated with a subscription.

22. The system of claim 7 further comprising:

preset charge data comprising preset flat-rate charges to customers, wherein a preset charge entry is expressed in a local currency with which a corresponding network customer is billed, and wherein the billing facility comprises processes for including the preset charge entry in submissions to the credit system.

23. The system of claim 22 wherein the at least one billing database includes real-time billing statements including the particularized local currency price for transmitting the data item.

24. A billing system for an on-line network, comprising:

a billing database;

an event generator providing, for the billing database, events indicative of network access by network customers;

a currency converter on a data center for receiving a network resource access price corresponding to an event stored in the billing database and expressed in a second currency, determining a first local currency corresponding to a base currency for a network customer that will receive a charge for the network resource access, and applying a currency exchange rate to the network resource access price to render a customer base currency price; and a credit company for receiving a charge from the data center comprising the customer base currency price.

25. The system of claim 24, wherein the billing database comprises a System Query Language (SQL) server.

26. The system of claim 24, wherein network access to the on-line network includes connect access.

27. The system of claim 24, wherein network access to the on-line network includes file download access.

28. The system of claim 24, wherein the network resource access price comprises transaction charge data.

29. The system of claim 24, wherein the network resource access price comprises periodic charge data.

30. The system of claim 24 further comprising a billing database providing real-time billing statements including the customer base currency price.

31. The system of claim 24 wherein the second currency is a local currency.

* * * * *

UNITED STATES PATENT AND TRADEMARK OFFICE
CERTIFICATE OF CORRECTION

PATENT NO. : 5,852,812
DATED : December 22, 1998
INVENTOR(S) : Reeder

It is certified that error appears in the above-identified patent and that said Letters Patent is hereby corrected as shown below:

In Column 4, line 44: "Ejarne" should read --Bjarne--.

In Column 5, line 67: "30 c" should read --30c--.

In Column 12, line 1: "353' as" should read --353' (see Fig. 6) as --.

In Column 12, line 6: "353" should read -353'--

Signed and Sealed this

Third Day of August, 1999

Attest:

Q. TODD DICKINSON

Attesting Officer

Acting Commissioner of Patents and Trademarks